May 9, 1933.　　G. R. ERICSON ET AL　　1,908,641
LUBRICATING SYSTEM
Original Filed June 15, 1929　　2 Sheets-Sheet 1
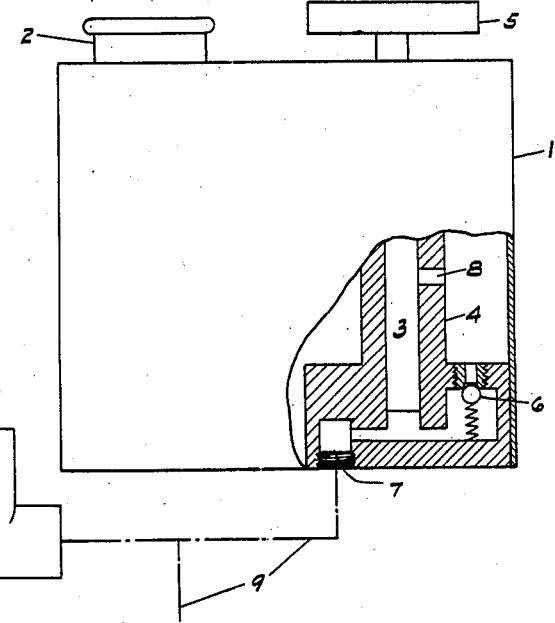
FIG.
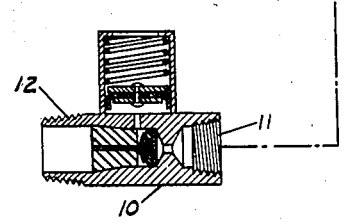
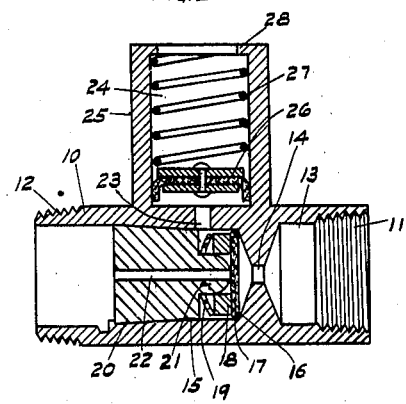
FIG. 2
FIG. 3
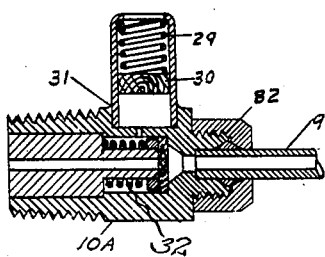
FIG. 4
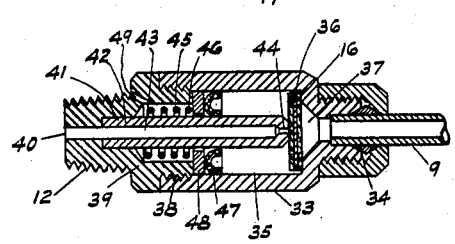
FIG. 5
Inventor
Phillip R. Wheeler
and
George R. Ericson
By George R. Ericson, Attorney

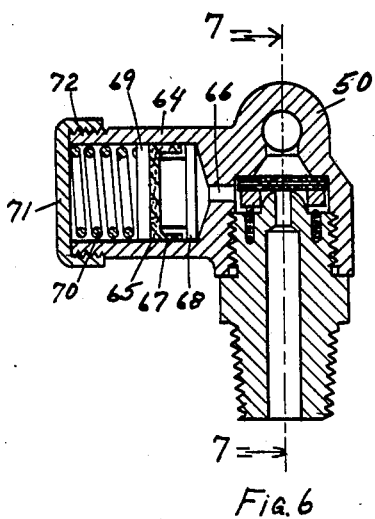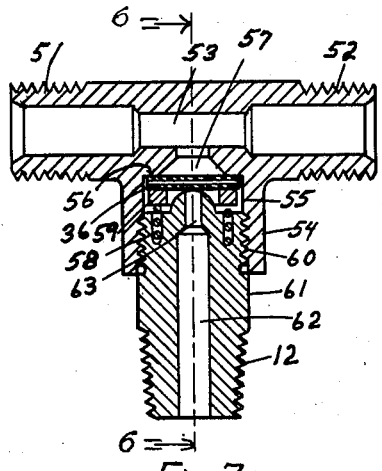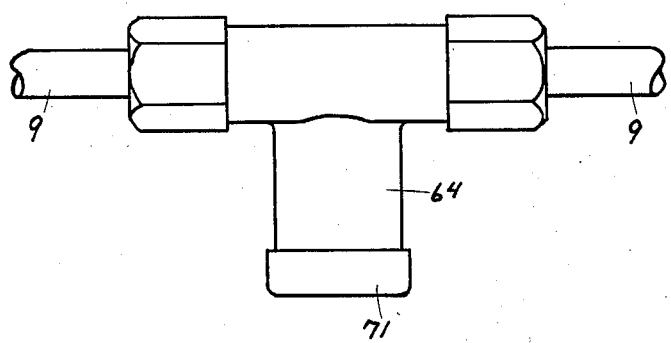

Patented May 9, 1933

1,908,641

UNITED STATES PATENT OFFICE

GEORGE R. ERICSON, OF ST. LOUIS, MISSOURI, AND PHILLIP R. WHEELER, OF MOUNT IDA, VIRGINIA, ASSIGNORS TO ALEMITE CORPORATION, OF CHICAGO, ILLINOIS, A CORPORATION OF DELAWARE

LUBRICATING SYSTEM

Application filed June 15, 1929, Serial No. 371,244. Renewed February 17, 1931.

This invention relates to centralized lubricating systems and particularly to such devices in which the lubricant is supplied intermittently from the central source through a piping system to the bearing.

An object of this invention is to provide a system which is capable of receiving and measuring out a predetermined quantity of lubricant for each bearing outlet and of subsequently discharging the said measured quantity through the outlet.

A further object of this invention is to provide a device of the above described character which is capable of handling lubricants of varying viscosities without adjustment or change of the volume of lubricant discharged.

A further object of this invention is to provide a system of this general type in which the amount of lubricant discharged at each operation is entirely independent of the rate at which it is supplied to the measuring devices.

A further object of this invention is to provide a novel system of simple construction which is capable of simultaneously discharging predetermined measured quantities of lubricant to the various outlets and which is not readily susceptible of derangement.

Other objects will appear from the following specification and the accompanying drawings, referring to which:

Figure 1 is a schematic illustration of a centralized system constructed in accordance with our invention.

Figure 2 shows a sectional view on a larger scale of one of the measuring units according to the embodiment of our invention shown in Figure 1.

Figure 3 is an exploded view showing several of the smaller parts of the device shown in Figure 2.

Figure 4 shows a sectional view of a somewhat modified form of outlet device.

Figure 5 shows a sectional view of a further modification of outlet device.

Figure 6 shows a sectional view of a further modification of outlet device taken on line 6—6 of Figure 7.

Figure 7 is a sectional view of the device shown in Figure 6 taken along the line 7—7.

Figure 8 is a plan view of the device shown in Figures 6 and 7.

The reference numeral 1 indicates a supply tank which may be of any suitable construction. This tank is provided with the usual filling opening 2 and is mounted in a suitable place on or near the machine which is to be lubricated. A pump piston 3 operably fitted to a pump casing 4 in or near the reservoir is provided with an operating handle 5. A suitable inlet check valve 6 and an outlet port 7 are provided. We prefer not to provide any packing for the piston 3, but to make this piston somewhat undersize so that a leakage will result. A port 8 leads from the upper part of the cylinder to the supply tank so that leakage will not result in loss of lubricant.

The piston may, if desired, be operated in either direction by a spring or by automatic means, but this is not shown for the reason that the specific operating means for the pump forms no part of the present invention. A conduit system 9 is attached to the reservoir to receive the lubricant discharged from the pump and to convey it to points adjacent the parts which are to be lubricated In the form of outlet device shown in Figures 1 and 2, a body member 10 is provided with suitable means such as screw threads 11 for connecting to the pipe line, and another suitable means such as screw threads 12 for connecting the device to a bearing. The body member 10 is provided with a lubricant inlet bore 13; this bore has a reduced portion 14 which provides communication with a second bore 15 which terminates adjacent the bore 14 in a valve seat 16.

A valve 17 cooperates with the seat to form an inlet check valve for the outlet device. A collar 18 and a spring 19 normally hold the valve 16 in closed position. The outlet valve portion 20 is suitably fixed in the bore 15. This member is provided with an extension 21 which normally contacts with one side of the valve 17. A small bore 22 extends through the valve member 20 and the extension in such a manner as to be closed by the valve 17. The valve member 20 also serves to hold the spring washer 19 in position.

The valve 17 preferably comprises a flexible diaphragm of leather, cork, celluloid, Empire cloth, or similar flexible but resilient sheet material. The embodiment shown in Figure 2 comprises a disk of celluloid having a disk of comparatively thin and soft leather cemented to each side thereof. We have found that cellulose lacquer is a very suitable cement for this purpose, and in some cases the leather is improved by soaking in lacquer and drying prior to cementing it to the celluloid.

At one side of the body member 10 a port 23 communicates with the bore 15 between the member 20 and the valve seat 16. A cylinder 24 is formed in a projection 25 on the side of the body member 10 and communicates with the port 23. A suitable spring pressed plunger 26 is fitted to the cylinder in a conventional manner. A spring 27 normally holds the plunger at the end of the cylinder adjacent to port 23. The top of the cylinder is turned in at 28 to retain the spring in position.

In the embodiment shown in Figure 4 the construction is similar to that shown in Figures 1 and 2, except as follows:

The cylinder 29 is provided with a wooden piston 30 which has the advantage of being very simple in construction and very durable. The cylinder 29 is formed of tubing and is attached as by soldering to the body member 10A at 31. A coiled spring 32 is used in place of the bent sheet metal washer 19. A slightly different form of coupling for the inlet pipe 9 is indicated at 82.

In the embodiment shown in Figure 5 the resilient storage chamber or cylinder is formed concentric with the inlet and outlet. The body member 33 is provided with suitable coupling means 34 to receive the inlet conduit 9; the bore 35 of the body member terminates in the valve seat 16. The valve 36 formed as heretofore described cooperates with the seat 16 and has one side exposed to the pressure in the inlet 37. The member 33 is provided with threads 38 for attaching an end member 39 which is provided with threads 12 to screw into the bearing. The member 39 has an outlet bore 40 and a bore 41 of slightly larger diameter to receive the outlet valve member 42. The outlet valve member 42 is provided with a suitable bore 43 which terminates at a bore 44 of comparatively small diameter. The end of the bore 44 normally is in contact with the flexible diaphram valve 36. The member 39 is counterbored at 45 to receive a spring 46. A plunger construction comprising a double cup leather 47 and a washer 48 is operated by the spring 46 in the bore 35. The counterbore 45 may be provided, if desired, with a vent 49 to the atmosphere.

The embodiment shown in Figures 6, 7, and 8 has certain advantages in systems where the supply conduit passes near one bearing in going to the next. A body member 50 is provided with projections 51 and 52 to which incoming and outgoing conduits may be attached. These conduits communicate with each other by means of the bore 53 which passes through the body member. A third projection 54 is bored at 55 to form the valve seat 56. A port 57 provides for communication between the bores 53 and 55. The flexible diaphram valve 36 of the type heretofore described is seated on the shoulder 56 by a spring 58 and a collar 59.

The projection 54 is threaded at 60 to receive the outlet member 61, the end of which is provided with threads 12 to screw into a bearing. The outlet bores 62 and 63 provide communication between the bore 55 and the bearing when the valve 36 permits. A fourth projection 64 on the body member 50 is bored to form the cylinder 65. A port 66 provides communication between the end of the cylinder and the bore 55. A plunger is formed by the cup leather 67 for operating with the supporting members 68 and 69. A spring 70 normally holds the plunger at the end of the cylinder adjacent the port 66. The spring is retained by a cap 71 which is retained by suitable threads 72 or other conventional means.

The operation is as follows:

The reservoir 1 being supplied with a suitable lubricant, the plunger 3 is operated to draw in lubricant from the reservoir through the check valve 6 and then to discharge it into the conduit system through outlet port 7. A steady but small leakage due to the normal operating clearance of the pump returns to the reservoir through the port 8. This leakage, however, is not sufficient to prevent the building up of considerable pressure in the conduit system 9.

The valve 17 as shown in Figure 2 normally closes both inlet and outlet, but upon the building up of pressure in the conduit system, the diaphram valve 17 is flexed to open the inlet valve 16 thereby permitting lubricant to flow into the bore 15 as shown in Figure 2 through the port 23 and into the cylinder 24 displacing the plunger 26 and compressing the spring 27. The central portion of the valve 17 is held by the pressure against the outlet port 22 and for that reason no lubricant can be discharged from the outlet device while the high pressure from the pump exists.

When the chamber 24 becomes full and the pressure in it equal to that of the supply line, the spring 19 seats the valve 17 against the shoulder 16. When the pressure in the pipe line, due to the operating clearance of the pump, has fallen to a degree somewhat lower than that existing in the bore 15, the pressure of lubricant in this bore flexes the central portion of the diaphragm valve 17 away from the end of the bore 22, thus permitting the escape of lubricant. The pressure of the spring 27 then discharges whatever lubricant is contained in the cylinder 24 to the bearings, and the device remains stationary until the next operation.

Referring to the device shown in Figure 4, the operation is substantially the same as that of the device shown in Figure 2.

Referring to the device shown in Figure 5, the operation is quite similar to that of the device as shown in Figures 2 and 4, it being understood that the resilient storage chamber is formed by the bore 35 and the plunger members 47 and 48.

Referring to the device shown in Figures 6, 7, and 8, the operation is substantially the same as heretofore described, it being understood that the resilient storage chamber comprises the cylinder 64 which extends at a right angle to both inlet and outlet.

It will be understood that the invention is susceptible of many modifications, and, accordingly, we do not wish to be limited in our protection, except as set forth in the accompanying claims.

We claim:

1. In a lubricating system, means for producing an intermittent pressure, a measuring chamber, a flexible disk forming inlet and outlet valve means for said measuring chamber, said inlet valve being operable by pressure from said intermittent source, said outlet valve being constructed and arranged to be opened by a pressure from said storage chamber at such times as said pressure exceeds the pressure from said intermittent source.

2. In a lubricating system, a discharge controlling device including a measuring chamber an inlet port and an outlet port, and a single flexible disk valve adapted to normally simultaneously close both said inlet and said outlet, said valve being flexed by pressure to selectively open either the inlet port or the outlet port.

3. In a lubricating system, a discharge controlling device comprising a measuring chamber, inlet and outlet ports for said measuring chamber, and a single flexible disk valve adapted to simultaneously close or selectively open said ports.

4. In a lubricating system, an outlet device comprising a measuring chamber having an inlet port and an outlet port, and a single flexible valve controlling both of said ports, said inlet port normally contacting one side of said valve, and said outlet port normally contacting the other side of said valve.

5. In a device of the class described, means forming a measuring chamber having an inlet port and an outlet port, said inlet port being of larger diameter than said outlet port, a diaphragm normally closing communication between said chamber and both of said ports, said inlet port being opened by movement of said diaphragm in one direction and said outlet port by movement of said diaphragm in the other direction.

6. In a device of the class described, an outlet device comprising a measuring chamber having an inlet port and an outlet port, said inlet port being of larger diameter than said outlet port, and a diaphragm normally closing both of said ports, and having a larger area exposed to the inlet port than to the outlet port.

7. In a device of the class described, an outlet device having concentric inlet and outlet ports opening into an expansible chamber, said inlet port being of larger diameter than said outlet port, a flexible diaphragm having its periphery on one side in contact with the inlet port, and its central portion on the other side in contact with the outlet portion.

8. In a device of the class described, a measuring chamber having an inlet and an outlet, a flexible disk for closing said inlet and said outlet, said outlet being closed when the pressure in said inlet exceeds the pressure in said chamber and open when the pressure in said chamber exceeds the pressure in said inlet.

9. In a device of the class described, an expansible measuring chamber having an inlet and an outlet, flexible disk valve means controlling said inlet and said outlet, and means responsive to a preponderance of pressure in the chamber over that in the inlet for opening said outlet.

10. A measuring valve comprising a bore terminating in an annular inlet valve seat of comparatively large diameter, a flexible disk adapted to contact with said seat, a member concentric with said bore having a part of comparatively small diameter adapted to contact with said valve, an axial bore in said member extending through said small portion to be closed by the outlet side of said valve, and means forming an expansible chamber in communication with the outlet side of said valve.

11. A lubricant measuring valve comprising an expansible chamber, inlet and outlet ports for said chamber, means for intermittently supplying lubricant to said inlet port, and means comprising a single floating disk valve for opening said inlet port while closing said outlet port during the introduction of lubricant through said inlet to said chamber, said means being entirely independent of the rate at which the lubricant is supplied.

12. In a lubricant measuring device, the combination of a body member having a cylindrical chamber formed therein, a discharge tube secured in said body and projecting into said cylindrical chamber substantially the entire length thereof, an annular piston guided by said discharge tube and sealing thereagainst, a spring for forcing said piston toward one end of said cylindrical chamber, means for supplying lubricant to said chamber at said last named end, and valve means for controlling the admission to and discharge of lubricant from said chamber.

PHILLIP R. WHEELER.
GEORGE R. ERICSON.